(12) United States Patent
Fujisawa et al.

(10) Patent No.: US 8,093,333 B2
(45) Date of Patent: Jan. 10, 2012

(54) HOT-MELT SILICONE ADHESIVE

(75) Inventors: Toyohiko Fujisawa, Ichihara (JP); Yoshito Ushio, Chiba (JP); Manabu Sutoh, Chiba (JP); Yoshinori Taniguchi, Ichihara (JP); Koji Nakanishi, Chiba (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 707 days.

(21) Appl. No.: 11/909,770

(22) PCT Filed: Mar. 27, 2006

(86) PCT No.: PCT/JP2006/306996
§ 371 (c)(1),
(2), (4) Date: Dec. 2, 2008

(87) PCT Pub. No.: WO2006/104236
PCT Pub. Date: Oct. 5, 2006

(65) Prior Publication Data
US 2009/0075009 A1  Mar. 19, 2009

(30) Foreign Application Priority Data
Mar. 29, 2005  (JP) ................. 2005-094514

(51) Int. Cl.
*C08L 83/04* (2006.01)
*B32B 33/00* (2006.01)
(52) U.S. Cl. .......................... 525/100; 428/41.8
(58) Field of Classification Search ............... 525/100; 428/41.8
See application file for complete search history.

(56) References Cited

U.S. PATENT DOCUMENTS

| | | | |
|---|---|---|---|
| 4,430,235 A | 2/1984 | Chu et al. | |
| 5,492,945 A | 2/1996 | Morita et al. | |
| 5,618,631 A | 4/1997 | Meguriya et al. | |
| 5,645,941 A * | 7/1997 | Meguriya et al. | 428/447 |
| 5,661,202 A | 8/1997 | Akamatsu et al. | |
| 5,714,265 A | 2/1998 | Meguriya et al. | |
| 5,859,127 A | 1/1999 | Nakano et al. | |
| 2002/0028335 A1 | 3/2002 | Fujiki et al. | |
| 2003/0221770 A1* | 12/2003 | Meixner et al. | 156/230 |
| 2008/0255321 A1* | 10/2008 | Nakashima et al. | 525/476 |

FOREIGN PATENT DOCUMENTS

| | | |
|---|---|---|
| EP | 0548969 | 6/1993 |
| EP | 0661334 | 7/1995 |
| EP | 0958805 | 11/1999 |
| EP | 1002834 | 5/2000 |
| GB | 2279616 | 1/1995 |
| JP | 63-199220 | 8/1988 |
| JP | 2117682 | 5/1990 |
| JP | 3020324 | 1/1991 |
| JP | 4348143 | 12/1992 |
| JP | 07-102075 | 4/1995 |
| JP | 08-176447 | 7/1996 |
| JP | 09-151253 | 6/1997 |
| JP | 11-012546 | 1/1999 |
| JP | 2004-043814 | 2/2004 |
| JP | 2004-043815 | 2/2004 |
| WO | WO 2004/061002 | 7/2004 |
| WO | WO 2005/021652 | 3/2005 |

OTHER PUBLICATIONS

English language abstract for JP 2117682 extracted from espacenet.com database dated Feb. 19, 2008.
English language abstract for JP 3020324 extracted from espacenet.com database dated Feb. 19, 2008.
English language abstract for JP 4348143 extracted from espacenet.com database dated Feb. 18, 2008.
English language abstract for JP 7102075 extracted from espacenet.com database dated Feb. 18, 2008.
English language translation and abstract for JP08-176447 extracted from *Searching PAJ* database dated Dec. 9, 2007, 28 pages.
English language abstract for JP 9151253 extracted from espacenet.com database dated Feb. 19, 2008.
English language abstract for JP 11012546 extracted from espacenet.com database dated Dec. 16, 2007.
English language abstract for JP63199220 extracted from espacenet.com database dated Feb. 19, 2008.
English language translation and abstract for JP2004-043814 extracted from *Searching PAJ* database dated Dec. 16, 2007, 51 pages.
English language translation and abstract for JP2004-043815 extracted from *Searching PAJ* database dated Dec. 9, 2007, 21 pages.
PCT International Search Report for PCT/JP2005/011864, Jan. 20, 2006, 5 pages. PCT International Search Report for PCT/JP2005/018405, Mar. 22, 2006, 6 pages.
PCT International Search Report for PCT/JP2005/023444, Apr. 05, 2006, 3 pages.
PCT International Search Report for PCT/JP2005/024196, Mar. 20, 2006, 3 pages.
PCT International Search Report for PCT/JP2006/305637, Mar. 20, 2006, 4 pages.
Yongxin Han et al. "Silicon Directed *ipso*-Substitution of Polymer Bound Arylsilanes: Preparation of Biaryls via", Tetrahedron Letters, vol. 37, No. 16. 1996, pp. 2703-2706.

(Continued)

*Primary Examiner* — Ling Choi
*Assistant Examiner* — Chun-Cheng Wang
(74) *Attorney, Agent, or Firm* — Howard & Howard Attorneys PLLC

(57) ABSTRACT

A hot-melt silicone adhesive comprising: (A) an organopolysiloxane resin with a softening point in the range of 40 to 250° C.; (B) an organopolysiloxane that at 25° C. is liquid or in the state of a crude rubber, which contains in one molecule at least two alkenyl groups; (C) a composition selected from a mixture of (i) an organopolysiloxane that contains silicon-bonded hydrogen atoms and (ii) an organic silicon compound that contains a silicon-bonded alkoxy group; or (iii) an organopolysiloxane that contains silicon-bonded hydrogen atoms and a silicon-bonded alkoxy group; (D) a hydrosilylation catalyst; and (E) a hydrosilylation-reaction inhibitor, demonstrates good gap-filling ability during thermo-compressive bonding to adherends with high surface roughness, even at low pressures, and that provides strong adhesion to the adherend after cross-linking.

14 Claims, No Drawings

OTHER PUBLICATIONS

Schultz et al., "The Synthesis of Trimethylsilylmethoxymethyl Chloride", OPPI Briefs, vol. 27, No. 5, 1995, pp. 572-574.

Hojo et al., "New Access to Carbonyl Ylides by the Silicon-Based 1,3-Elimination and Their:..", Tetrahedron Letters, vol. 34, No. 37, 1993, pp. 5943-5946.

Boons et al., "Use of (Phenyldimethylsilyl)methoxymethyl and (Phenyldimethylsilyl)methyl ethers . . . ", Tetrahedron Letters, vol. 31, No. 15, 1990, pp. 2197-2200.

Hasseberg et al., "104. Synthese von Orellin", Helvetica Chimica Acta—vol. 71, No. 5, 1988, pp. 957-963.

Guedin-Vuong et al., "An Easy Access to Homopropargylic Ethers", Bulletin De La Societe Chimique De France, No. 2, 1986, pp. 245-252.

Pyne et al., "Chiral and Stereochemical Control via Intramolecular Diels-Alder Reaction of Z Dienes", J. American Chemical Society, vol. 104, No. 21, 1982, pp. 5719-5728.

Lipshutz et al., "B-(Trimethylylsilyl) Ethoxymethyl Chloride . . . ," Tetrahedron Letters, vol. 21, No. 35, 1980, pp. 3343-3346.

Shikhiev et al., "Synthesis and Reactions of Unsaturated Organosilicon Compounds", J. Of General Chemistry of the USSR, vol. 41, No. 3, 1971, pp. 617-619.

Shipov et al., "Synthesis of Alkyl Chloromethyl Ethers", J. Of General Chemistry of the USSR, vol. 59, No. 5.2, 1989, p. 1067.

Miramon et al., "Short Synthesis of Polyoxygenated Macrocyclic . . . ", Journal of Organic Chemistry, vol. 69, No. 20, 2004, pp. 6949-6952.

Shikhiev et al., "Synthesis and Reactions of Some Heteroorganic Ethers . . . ", J. Of General Chemistry of the USSR, vol. 45, No. 1, 1975, pp. 91-93.

* cited by examiner

HOT-MELT SILICONE ADHESIVE

RELATED APPLICATIONS

This application claims priority to and all the advantages of International Patent Application No. PCT/JP2006/306996, filed on Mar. 27, 2006, which claims priority to Japanese Patent Application No. 2005-094514, filed on Mar. 29, 2005.

TECHNICAL FIELD

The present invention relates to a hot-melt silicone adhesive, in particular to a reactive hot-melt silicone adhesive which melts and cures when heated.

BACKGROUND ART

A silicone-type adhesive in the form of a hydrosilylation-curable silicone composition that is cured when it is sandwiched between two sheets of protective film (see Japanese Unexamined Patent Application Publication No. H11-12546) is suitable for adhesively attaching a semiconductor chip to a chip-attaching part, but when the thickness of the sheet is 50 μm or less, and when the roughness on the surface of the chip-attaching part is equal to or greater than 10 μm, the gap-filling capacity of the bonding sheet becomes insufficient for filling the valleys of the microroughness, whereby it becomes impossible to provide sufficient strength of the adhesive connection.

Although a laminated sheet structure composed of a cray-like curable silicone composition layer and a cured silicone layer, or of two clay-like curable silicone composition layers having different speeds of curing (see Japanese Unexamined Patent Application Publication No. 2004-43814), possesses satisfactory gap-filling properties, such properties are still insufficient when the allowable die-attach pressure is limited due to the extreme thinness of film-like stack-package type chips which have been recently developed.

It is an object of the present invention to provide a reactive hot-melt silicone adhesive that demonstrates good gap-filling ability during thermo-compressive bonding to adherends with high surface roughness even with application of low pressures and that provides strong adhesion to the adherend after curing.

DISCLOSURE OF INVENTION

The hot-melt silicone adhesive of the present invention comprises:
(A) an organopolysiloxane resin with a softening point in the range of 40 to 250° C. that contains in one molecule at least one aryl group and contains neither a silicon-bonded alkoxy group nor a silicon-bonded hydrogen atom;
(B) an organopolysiloxane that at 25° C. is liquid or is in the state of a crude rubber, which contains in one molecule at least two alkenyl groups and at least one aryl group and which contains neither a silicon-bonded alkoxy group nor a silicon-bonded hydrogen atom;
(C) a composition selected from a mixture of (i) an organopolysiloxane that contains in one molecule at least two silicon-bonded hydrogen atoms and does not contain a silicon-bonded alkoxy group and (ii) an organic silicon compound that contains in one molecule at least one silicon-bonded alkoxy group; or (iii) an organopolysiloxane that contains in one molecule at least two silicon-bonded hydrogen atoms and at least one silicon-bonded alkoxy group;
(D) a hydrosilylation catalyst; and
(E) a hydrosilylation-reaction inhibitor.

EFFECTS OF INVENTION

The hot-melt silicone adhesive of the present invention is characterized by good gap-filling ability during thermo-compressive bonding to an adherend with high surface roughness even with application of low pressures and by strong adhesion to the adherend after curing.

DETAILED DESCRIPTION OF THE INVENTION

Component (A), which is one of the main components of the proposed adhesive, is an organopolysiloxane resin with a softening point in the range of 40 to 250° C. that contains in one molecule at least one aryl group and contains neither a silicon-bonded alkoxy group nor a silicon-bonded hydrogen atom. The aryl groups of component (A) may be represented by phenyl, tolyl, xylyl, and naphthyl groups, of which most preferable are phenyl groups. Component (A) should contain in one molecule at least one aryl group. It is preferable, however, that the aryl groups be contained in the amount of 0.1 to 0.9, preferably 0.3 to 0.9, per one silicon atom of component (A). Groups other than aryl groups that are bonded to silicon atoms may be represented by methyl, ethyl, propyl, or similar alkyl groups; vinyl, allyl, butenyl, pentenyl, hexenyl, or similar alkenyl groups; benzyl, phenethyl, or similar aralkyl groups; 3-chloropropyl, 3,3,3-trifluoropropyl, or similar halogenated alkyl groups; as well as small quantities of hydroxyl groups. Most preferable component (A) is the one that contains in one molecule at least one alkenyl group. It is preferable that the quantity of such alkenyl groups in one molecule does not exceed 20 and preferably be in the range of 2 to 10. In order to provide reliable thermal melting of the adhesive and better gap-filling properties, the composition (A) should have a softening point in the range of 60 to 200° C. There are no special restrictions with regard to the molecular weight of component (A), but it is preferable to have a mass-average molecular weight in the range of 2,000 to 50,000, preferably 5,000 to 20,000.

The aforementioned component (A) may be an organopolysiloxane resin represented by the following average unit formula:

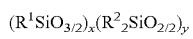

$(R^1SiO_{3/2})_x(R^2{}_2SiO_{2/2})_y$.

In the formula, $R^1$ and $R^2$ may be the same or different optionally substituted univalent hydrocarbon groups that can be exemplified by methyl, ethyl, propyl, or similar alkyl groups; vinyl, allyl, butenyl, pentenyl, hexenyl, or similar alkenyl groups; benzyl, phenethyl, or similar aralkyl groups; phenyl, tolyl, xylyl, naphthyl, or similar aryl groups; 3-chloropropyl, 3,3,3-trifluoropropyl, or similar halogenated alkyl groups. At least one of $R^1$ or $R^2$ should be an aryl group. In particular, $R^1$ may be an aryl group, while $R^2$ may be an optionally substituted univalent hydrocarbon group other than an aryl group. In the above formula, "x" and "y" are positive numbers that satisfy the following condition: x+y=1. Aforementioned component (A) may be exemplified by the following compounds: an organopolysiloxane resin composed of units of formulae $(CH_3)_2SiO_{2/2}$, $CH_3(CH_2=CH)SiO_{2/2}$, and $C_6H_5SiO_{3/2}$; an organopolysiloxane resin composed of units of formula $(CH_3)_2SiO_{2/2}$ and formula $C_6H_5SiO_{3/2}$; an organopolysiloxane resin composed of units of formulae $(CH_3)_2SiO_{2/2}$, $CH_3(CH_2\!=\!CH)SiO_{2/2}$, $C_6H_5SiO_{3/2}$, and $CH_3SiO_{3/2}$; and an organopolysiloxane resin composed of units of formulae $(C_6H_5)_2SiO_{2/2}$, $CH_3(CH_2\!=\!CH)SiO_{2/2}$, and $C_6H_5SiO_{3/2}$. These compounds can be mixed in combinations of two or more.

Component (B) is used for imparting to the adhesive of the invention an appropriate softness. It is comprised of an organopolysiloxane that at 25° C. is liquid or is in the state of a crude rubber, which contains in one molecule at least two alkenyl groups and at least one aryl group and which contains neither a silicon-bonded alkoxy group nor a silicon-bonded hydrogen atom. The alkenyl groups contained in component (B) are the same as mentioned above and, preferably, should be vinyl groups. It is also preferable that 2 to 10 such alkenyl groups be contained in one molecule. The aryl group of component (B) may be the same as exemplified earlier and is, preferably, a phenyl group. It is also recommended that the aryl groups be contained in an amount compatible with component (A). More specifically, they should be contained in an amount of 0.1 to 0.9 per one silicone atom of component (B). There are no special restrictions with regard to the molecular structure of component (B), and it may have a linear, branched, or partially branched linear molecular structure. At 25° C., component (B) is liquid or in the state of a crude rubber, but in order not to make the adhesive too soft, the viscosity at 25° C. should be equal to or greater than 10,000 mPa·s.

Aforementioned component (B) may be comprised of an organopolysiloxane represented by the following general formula:

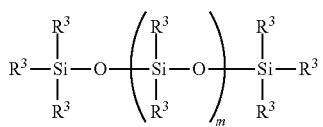

In this formula, $R^3$ may designate the same or different optionally substituted univalent hydrocarbon groups which can be exemplified by the same groups as mentioned previously. It is required that at least two $R^3$'s be alkenyl groups and at least one $R^3$ be an aryl group. Furthermore, in the above formula, "m" is an integer equal to or greater than 1, and in order to maintain the organopolysiloxane at 25° C. in a liquid or in a crude rubber state, the aforementioned organopolysiloxane should have viscosity at 25° C. equal to or greater than 10,000 mPa·s.

Component (B) may also comprise organopolysiloxanes represented by the following general formulae:

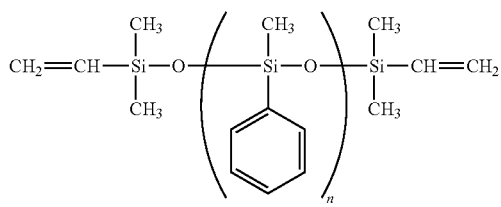

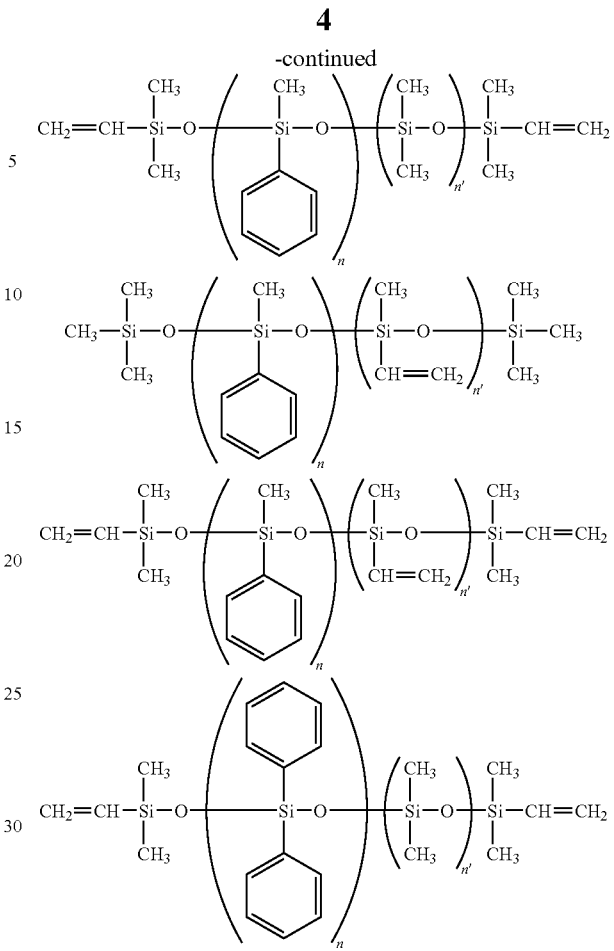

These organopolysiloxanes can be used in combinations of two or more. In the above formulae, "n" and "n'" are integers equal to or greater than 1.

There are no special restrictions with regard to the contents of component (B), but it is recommended to use it in an amount of 10 to 500, preferably 20 to 100 parts by mass per 100 parts by mass of component (A). If the contents of component (B) are below the recommended lower limit, this will reduce softening of the adhesive, and if, on the other hand, the contents of component (B) exceed the recommended upper limit, it may create problems in the preparation of a hot-melt adhesive.

Component (C) of the composition is selected from a mixture of (i) an organopolysiloxane that contains in one molecule at least two silicon-bonded hydrogen atoms and does not contain a silicon-bonded alkoxy group and (ii) an organic silicon compound that contains in one molecule at least one silicon-bonded alkoxy group; or (iii) an organopolysiloxane that contains in one molecule at least two silicon-bonded hydrogen atoms and at least one silicon-bonded alkoxy group. In the composition of the adhesive, constituent (i) acts as a cross-linking agent, constituent (ii) acts as an adhesion accelerator, and constituent (iii) acts as a cross-linking agent and an adhesion accelerator.

Constituent (i) is an organopolysiloxane that contains in one molecule at least two silicon-bonded hydrogen atoms and does not contain a silicon-bonded alkoxy group. It is recommended that the number of silicon-bonded hydrogen atoms inone molecule of this constituent be within the range of 3 to 30.

Silicon-bonded groups of this constituent other than silicon-bonded hydrogen atoms may be represented by optionally substituted univalent hydrocarbon groups other than alkenyl groups, such as methyl, ethyl, propyl, or similar alkyl groups; phenyl, tolyl, xylyl, naphthyl, or similar aryl groups; benzyl, phenethyl, or similar aralkyl groups; 3-chloropropyl, 3,3,3-trifluoropropyl, or similar halogenated alkyl groups. From the point of view of better compatibility of constituent (i) with components (A) and (B), it is preferable to have in one molecule of this constituent at least one aryl group, in particular, a phenyl group. There are no special restrictions with regard to the molecular structure of constituent (i), and it may have a linear, branched, partially-branched linear, cyclic, or dendritic molecular structure.

Constituent (i) may be represented by an organopolysiloxane resin composed of units of formulae $(CH_3)_2HSiO_{1/2}$ and $C_6H_5SiO_{3/2}$; an organopolysiloxane resin composed of units of formulae $(CH_3)_2HSiO_{1/2}$, $(CH_3)_3SiO_{1/2}$, and formula $C_6H_5SiO_{3/2}$; an organopolysiloxane resin composed of units of formulae $(CH_3)_2HSiO_{1/2}$ and $SiO_{4/2}$; an organopolysiloxane resin composed of units of formulae $(CH_3)_2HSiO_{1/2}$, $(CH_3)_2SiO_{2/2}$, and $SiO_{4/2}$; and organopolysiloxanes represented by the following general formulae:

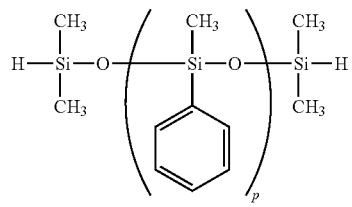

-continued

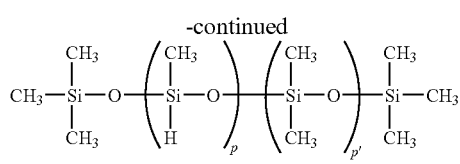

These organopolysiloxanes can be used in combinations of two or more. In the above formulae, "p" and "p'" are integers equal to or greater than 1.

There are no special restrictions with regard to the amounts in which constituent (i) can be used, provided that these amounts are sufficient for cross-linking of the adhesive composition. It is recommended, however, to add this constituent in an amount of 0.1 to 50 parts by mass, preferably 1 to 30 parts by mass per 100 parts by mass of the sum of components (A) and (B). It is also recommended to use this constituent in such an amount that the mole ratio of silicon-bonded hydrogen atoms of constituent (i) to the sum of alkenyl groups contained in components (A) and (B) is within the range of 0.3 to 20, preferably 0.8 to 3.

Constituent (ii) is an organic silicon compound that contains in one molecule at least one silicon-bonded alkoxy group. This constituent can be exemplified by the following compounds: tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltrimethoxysilane, allyltrimethoxysilane, allyltriethoxysilane, 3-glycidoxypropyltrimethoxysilane, 2-(3,4-epoxycyclohexyl)-ethyltrimethoxysilane, 4-oxiranylbutyltrimethoxysilane, 3-methacryloxypropyltrimethoxysilane, N-phenyl-3-aminopropyltrimethoxysilane, or similar alkoxysilane compounds; silatrane derivatives of the following general formula:

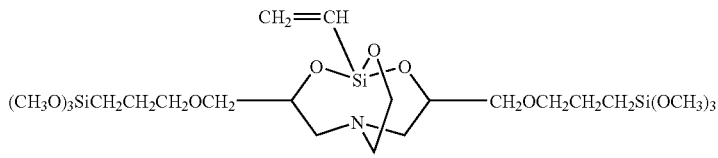

-continued

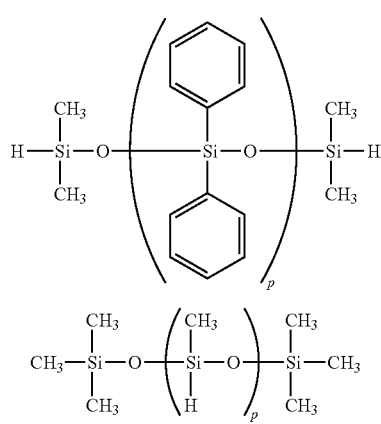

or similar silatrane derivatives that contain in one molecule an alkenyl group and a silicon-bonded alkoxy group; as well as siloxane compounds that contain in one molecule at least one silicon-bonded alkenyl group, or a silicon-bonded hydrogen atom, and a silicon-bonded alkoxy group; a mixture composed of a silane or siloxane compound having at least one silicon-bonded alkoxy group and a siloxane compound having in one molecule at least one silicon-bonded hydroxy group and a silicon-bonded alkenyl group; a siloxane compound represented by the following average unit formula:

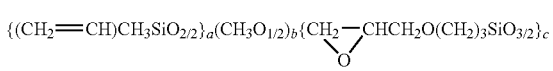

(wherein "a", "b", and "c" are positive numbers); a siloxane compound represented by the following average unit formula:

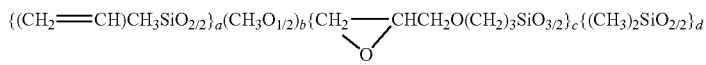

(wherein "a", "b", "c", and "d" are positive numbers); or combinations of two or more of the aforementioned compounds.

There are no special restrictions with regard to the amounts in which constituent (ii) can be used, provided that the amount is sufficient for imparting to the composition good adhesive properties. It may be recommended to use constituent (ii) in amount of 0.01 to 20, preferably 0.1 to 10 parts by mass per 100 parts by mass of the sum of components (A) and (B). If this constituent is used in an amount less than the lower recommended limit, this will impair the adhesive properties of the adhesive composition, and if, on the other hand, it is used in an amount exceeding the recommended upper limit, this will not significantly improve adhesive properties but will be economically unjustifiable.

Constituent (iii) is an organopolysiloxane that contains in one molecule at least two silicon-bonded hydrogen atoms and at least one silicon-bonded alkoxy group. Silicon-bonded alkoxy groups contained in constituent (iii) may be exemplified by methoxy, ethoxy, and propoxy groups, of which methoxy groups are preferable for obtaining better adhesive properties. The aforementioned silicon-bonded alkoxy groups can be bonded to silicone atoms of the main chain directly or through an oxygen atom or an alkylene group. Silicon-bonded groups other than silicon-bonded hydrogen atoms and silicon-bonded alkoxy groups that may be contained in constituent (iii) are the following: methyl, ethyl, propyl, or similar alkyl groups; phenyl, tolyl, xylyl, naphthyl, or similar aryl groups; benzyl, phenethyl, or similar aralkyl groups; 3-chloropropyl, 3,3,3-trifluoropropyl, or similar halogenated alkyl groups; 3-glycidoxypropyl, or similar glycidoxyalkyl groups; 2-(3,4-epoxycyclohexyl)-ethyl, or similar epoxycyclohexyl alkyl groups; 4-oxiranylbutyl, 8-oxiranyloctyl, or similar oxiranylalkyl groups; 3-methacryloxypropyl, or similar acryloxyalkyl groups; and 3-hydroxypropyl, or similar hydroxyalkyl groups. There are no special restrictions with regard to the molecular structure of constituent (iii) which may have a linear, branched, partially branched linear, cyclic, or dendritic molecular structure.

The aforementioned constituent (iii) may be comprised of organopolysiloxanes represented by the following general formulae:

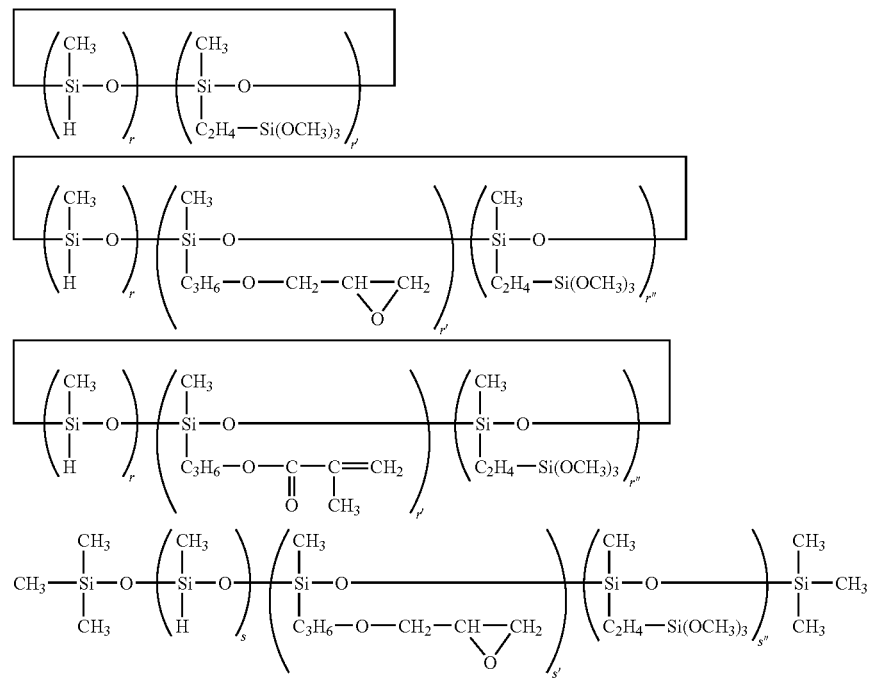

These compounds can be used in combinations of two or more. In the above formula, "r", "r'", and "r''" are integers equal to or greater than 1; (r+r') and (r+r'+r'') are integers equal to or greater than 3. In the above formula, "s", "s'", and "s''" are integers equal to or greater than 1.

There are no special restrictions with regard to the amounts in which constituent (iii) may be added, provided that the added amount is sufficient for cross-linking the adhesive composition. It may be recommended, however, to add constituent (iii) in an amount of 0.1 to 50 parts by mass, preferably 1 to 30 parts by mass per 100 parts by mass of the sum of components (A) and (B). It is also recommended to use this constituent in such an amount that the mole ratio of silicon-bonded hydrogen atoms of constituent (iii) to the sum of alkenyl groups contained in components (A) and (B) is within the range of 0.3 to 20, preferably 0.8 to 3.

Component (D) is a hydrosilylation catalyst that accelerates cross-linking of the adhesive composition. Specific examples of this component are the following: platinum-type catalysts, rhodium-type catalysts, palladium-type catalysts, or similar known catalysts used for hydrosilylation reactions.

Most preferable are platinum-type catalysts that can be exemplified by chloroplatinic acid, an alcohol solution of a chloroplatinic acid, a platinum-olefin complex, a platinum-carbonyl complex, a platinum-alkenylsiloxane complex, platinum black, platinum fine powder on a silica carrier, or microcapsulated catalysts with capsules made from acrylic resins, polycarbonate resins, or silicone resins in which the aforementioned platinum catalysts are dispersed or contained and which should have a softening point within the range of 40 to 170° C.

There are no special restrictions with regard to the amounts in which component (D) can be used, provided that these amounts are able to accelerate cross-linking of the adhesive composition. It may be recommended, however, to add component (D) in an amount of 0.01 to 1,000 ppm, preferably in an amount of 0.1 to 500 ppm, in terms of mass units of metallic platinum contained in this catalyst.

Component (E) is a cross-linking inhibitor that is used for adjusting cross-linking speed of the adhesive composition. If the cross-linking reaction progresses too quickly prior to compressive adhesion of the composition to the adherend, the composition may appear to be insufficiently soft during thermo-compressive adhesion and, as a result, will not possess sufficient gap-filling ability. Component (E) is exactly the one that is needed to protect the composition from the loss of the aforementioned gap-filling ability. Component (E) can be exemplified by 2-methyl-3-butyn-2-ol, 3,5-dimethyl-1-hexyn-3-ol, 2-phenyl-3-butyn-2-ol, or similar alkyne alcohols; tris(1,1-dimethyl-2-propynyloxy)methylsilane, or similar silyl esters of alkyne alcohols; 3-methyl-3-penten-1-yne, 3,5-dimethyl-3-hexen-1-yne, or similar enyne compounds; 1,3,5,7-tetramethyl-1,3,5,7-tetravinylcyclotetrasiloxane, 1,3,5,7-tetramethyl-1,3,5,7-tetrahexenylcyclotetrasiloxane, and benzotriazole.

There are no special restrictions with regard to the amounts in which component (E) should be used because the added amounts will depend on the speed of cross-linking required for the adhesive composition. It may be recommended, however, to use this component in an amount of 0.00001 to 5 parts by mass per 100 parts by mass of the sum of components (A) and (B).

Within the limits that are not in contradiction with the objects of the present invention, the adhesive composition may be combined with other arbitrary components such as dry-process silica, wet-process silica, baked silica, crystalline silica, titanium oxide, alumina, calcium carbonate, carbon black, or other inorganic fillers; the aforementioned surface treated with organohalosilane, organoalkoxysilane, organosilazane, or similar organic silicon compounds; finely powdered silicone resin, epoxy resin, fluororesin, or similar organic resins; fine metal powder of silver, copper, or the like; toluene, xylene, or other diluents. Examples of other additives are dyes and pigments. In order to improve efficiency of constituents (ii) and (iii) in accelerating adhesion, they may be combined with condensation-reaction catalysts such as organotitanium, organozirconium or organoaluminum compounds that are dispersed or contained in microcapsules of acrylic resin, polycarbonate resin, or silicone resin, which resins have a melting point of 40 to 200° C.

The reactive hot-melt adhesive of the present invention which is composed of components (A) through (E) may exist in a non-cross-linked state or it may be cross-linked to a B stage. Although there are no special restrictions in this regard, the adhesive may be formed into a film, preferably into a film which is not sticky at 25° C. When the adhesive of the invention is made as a film, in order to protect it from accumulation of dust or the like, it is recommended to cover both sides of the product film with peelable, protective films. Such peelable, protective films can be made from polyethylene resin (PE), polypropylene resin (PP), polyethyleneterephalate (PET), polyethylenesulfonic resin (PES), fluororesin (PTFE), polyimide resin (PI), metal foil, or foil, the surface of which is coated with PTFE, PES, or the like. When the product is made as a die-attach film, it may also be used as a dicing tape. When the adhesive is in the form of a film, the thickness of the film can be adjusted in accordance with specific applications, but, in general, it may be within the range of 10 to 500 μm.

It is recommended that when still in an uncured state, the adhesive of the invention has a storage modulus of elasticity at 30° C. within the range of $1 \times 10^4$ to $1 \times 10^8$ Pa, preferably $1 \times 10^5$ to $1 \times 10^7$ Pa. When the storage modulus of elasticity of an uncured adhesive at 30° C. is below the recommended lower limit, this will impair film-forming properties of the adhesive at room temperature (25° C.), and if, on the other hand, the viscosity exceeds the recommended upper limit, the film formed from this adhesive will be subject to cracking. It is also recommended that viscosity of the adhesive in an uncured state at 100° C. does not exceed $1 \times 10^4$ Pa·s, and is preferably $1 \times 10^3$ Pa·s or below. When the viscosity of the adhesive in an uncured state at 100° C. exceeds the upper limit, this will impair the gap-filling ability of the adhesive when a relatively low pressure is applied.

There are no special restrictions with regard to the methods that can be used for the preparation of the adhesive of the present invention, and the following methods can be used. Components (A) through (E) are dissolved in a solvent such as toluene, and the obtained solution is applied onto the surface of the peelable film with subsequent removal of the solvent. This can be achieved by drying the product with hot air, or it may be required to maintain the adhesive in an uncured state by adjusting the added amount of component (E). A reactive hot-melt-type silicone adhesive film having a three-layer structure can then be prepared by laminating the above-mentioned film between two other peelable films attached to both sides thereof.

Alternatively, components (A) through (E) can be mixed and kneaded in a kneader-mixer, where they are mixed while heating to the condition where the composition still remains uncured. The obtained mixture is sandwiched between two peelable films, and the assembly is subjected to thermal compression in a hot press to a temperature exceeding the softening point of the adhesive, whereby a reactive hot-melt-type silicone adhesive film having a three-layer structure is obtained.

By cross-linking, the adhesive product of the invention may be effectively adhered to various substrates such as substrates made from glass, silicon wafers, aluminum, stainless steel, nickel, polyimide resin, or the like. Curing can be carried out with heating for 10 to 120 min at 100 to 170° C. It is recommended in this case that the storage modulus of elasticity in a cured body at 30° C. be within the range of $1 \times 10^6$ to $1 \times 10^{10}$ Pa. When it is needed to impart stress-relaxation properties to the cured body, the storage modulus of elasticity should not exceed $1 \times 10^9$ Pa.

There are no special restrictions with regard to the methods of use of the adhesive of the invention. For example, when the adhesive product is used for attaching a semiconductor chip to a chip-attaching part, the adhesive product is cut into sections of predetermined dimensions, the peelable film is removed from one side of the product, and the exposed side is attached to the surface of the chip-attaching part in a thermo-compressive operation at a pressure of 0.01 to 0.1 MPa and at a temperature of 100 to 150° C., whereby the adhesive material is softened, fused, and completely fills the unevenness on the surface of the chip-attaching part. In other words, the adhesive product is attached to the chip-attaching part with pressure-sensitive adhesion and with sufficiently strong adhesive connection of the adhesive product to the mating part. The protective film is then peeled from the other side of the product, and a semiconductor chip is attached by compressive adhesion at 20 to 150° C. under pressure of 0.01 to 0.1 MPa. Following this, the obtained three-layered structure composed of the semiconductor chip, adhesive product, and the chip-attaching part is heated for 10 to 120 min in an oven at 100 to 170° C., whereby the adhesive composition is cured, and the semiconductor chip is firmly attached through the cured adhesive layer to the chip-attaching part.

EXAMPLES

The hot-melt silicone adhesive of the present invention will be further described in more detail with reference to practical and comparative examples. The following starting material components were used for the preparation of the hot-melt silicone adhesive:

Component A1: organopolysiloxane resin (contents of vinyl groups=2.3 mass %; mass-average molecular weight=7,000; softening point=150° C.) represented by the following average unit formula:

$(C_6H_5SiO_{3/2})_{0.75}[(CH_3)_2SiO_{2/2}]_{0.15}[(CH_2=CH)CH_3SiO_{2/2}]_{0.10}$;

Component A2: organopolysiloxane resin (contents of vinyl groups=1.2 mass %; mass-average molecular weight=7,000; softening point=150° C.) represented by the following average unit formula:

$(C_6H_5SiO_{3/2})_{0.75}[(CH_3)_2SiO_{2/2}]_{0.20}[(CH_2=CH)CH_3SiO_{2/2}]_{0.05}$;

Component A3: solid organopolysiloxane resin (contents of vinyl groups=2.0 mass %; mass-average molecular weight=12,000) at the room temperature without showing softening point; represented by the following average unit formula:

$(SiO_{4/2})_{0.60}[(CH_3)_3SiO_{1/2}]_{0.35}[(CH_2=CH)(CH_3)_2SiO_{1/2}]_{0.05}$;

Component B1: methylphenylpolysiloxane (contents of vinyl groups=0.49 mass %; viscosity=60 Pa·s) represented by the following average formula:

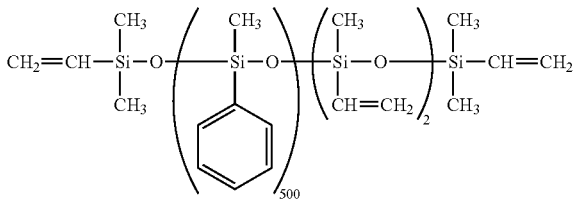

Component B2: copolymer of methylphenylsiloxane and methylvinylsiloxane (contents of vinyl groups=0.16 mass %; viscosity=950 Pa·s) represented by the following average formula:

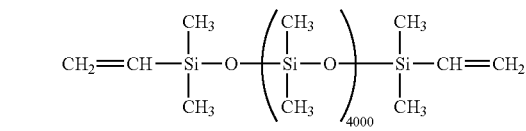

Component B3: crude rubber-like dimethylpolysiloxane (contents of vinyl groups=0.02 mass %; plasticity=150) represented by the following average formula:

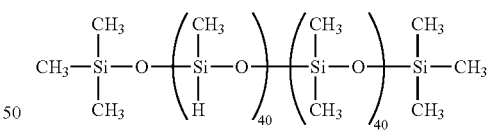

Component C1: organopolysiloxane having in one molecule six silicon-bonded hydrogen atoms (contents of silicon-bonded hydrogen atoms=0.66 mass %); represented by the following average unit formula:

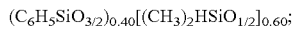

$(C_6H_5SiO_{3/2})_{0.40}[(CH_3)_2HSiO_{1/2}]_{0.60}$;

Component C2: copolymer of methylhydrogensiloxane and dimethylsiloxane (contents of silicon-bonded hydrogen atoms=0.73 mass %); represented by the following average formula:

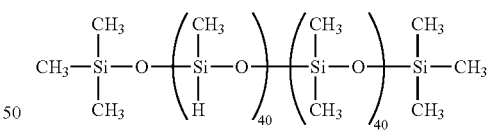

Component C3: organopolysiloxane (contents of silicon-bonded hydrogen atoms=0.47 mass %); represented by the following average formula:

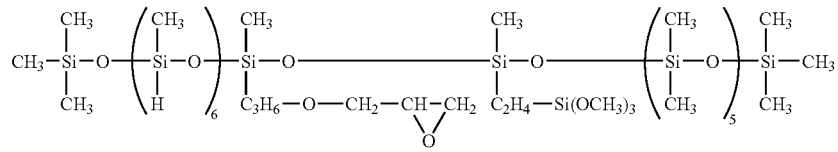

Component D1: silatrane derivative represented by the following formula:

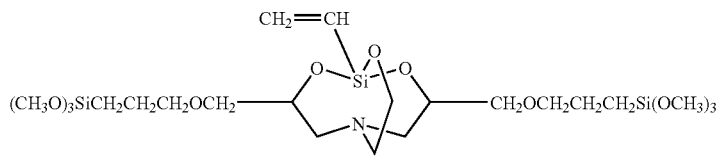

Component D2: N-phenyl-3-aminopropyltrimethoxysilane;
Component E1: isopropanol solution of a complex of platinum and 1,3-divinyl-1,1,3,3-tetramethyldisiloxane (contents of metallic platinum=2.5 mass %);
Component E2: microcapsulated catalyst containing a complex of platinum and 1,3-divinyl-1,1,3,3-tetramethyldisiloxane dispersed in polycarbonate resin (softening point=150° C.); with an average grain diameter of 1.5 μm and contents of metallic platinum of 0.25 mass %;
Component F1: tris(1,1-dimethyl-2-propynyloxy)methylsilane.

Practical Example 1

A toluene solution was prepared by mixing 60 parts by mass of Component A1, 26.5 parts by mass of component B1, 13 parts by mass of Component C1 (used in such an amount that the mole ratio of silicon-bonded hydrogen atoms contained in this Component C1 to the sum of vinyl groups of Components A1 and B1 is equal to 1.5), 1 part by weight of Component D1, and 0.5 parts by weight of Component F1, and dissolving the mixture in 100 parts by mass of toluene. The solution was then additionally mixed with 0.02 parts by mass of Component E1. The obtained toluene solution was applied onto a fluorosilicone-treated PET film, and the toluene was removed by heating the coated film with hot air for 5 min at 100° C. As a result, a PET film having a 50 μm-thick coating was obtained. Another fluorosilicone-treated PET film was laminated onto the first one, whereby a 50 μm-thick film-like reactive hot-melt silicone adhesive product coated on both sides with PET films was obtained.

The obtained silicone adhesive product was tested with regard to a storage modulus of elasticity at 30° C. and with regard to melt viscosity at 100° C. The results of measurements are shown in Table 1. The product was also evaluated with regard to gap-filling properties of the obtained silicone adhesive product. The results are also shown in Table 1.

[Gap-Filling Properties]

The 50-μm-thick film-like reactive hot-melt silicone adhesive product coated on both sides with PET films was cut into pieces of 7 mm×7 mm. The PET film was peeled from one side of the product, and a glass plate having dimensions of 7 mm×7 mm (thickness=200 μm) was applied onto the exposed surface at room temperature and under pressure of 0.02 MPa. The second PET film was then peeled off, and the exposed side was applied onto a solder-resist-supporting printed circuit board having maximum gaps (the height of microroughness) of 15 μm and dimensions of 7 mm×7 mm. The product was attached to the aforementioned printed circuit board by thermo-compressive adhesion with application of pressure equal to 0.02 MPa at 100° C. for 2 sec. The condition on the printed circuit board side of the obtained three-layer specimen composed of the glass plate, silicone adhesive product, and the printed circuit board was observed from the glass side of the specimen. It was considered that the gap-filling property exists if the surface was free of air bubbles. The gap-filling property was considered to be lacking if air bubbles were observed.

[Adhesive Properties]

The 50-μm-thick film-like reactive hot-melt silicone adhesive product coated on both sides with PET films was cut into pieces of 3 mm×3 mm. The PET film was peeled from one side of the product, and a silicon wafer (thickness=700 μm) of 3 mm×3 mm was applied onto the exposed surface at room temperature and under pressure of 0.02 MPa. The second PET film was then peeled off, and the exposed side was applied onto a solder-resist-supporting printed circuit board having maximum gaps (the height of microroughness) of 15 μm and dimensions of 7 mm×7 mm. The product was attached to the aforementioned printed circuit board by thermo-compressive adhesion with application of pressure equal to 0.02 MPa at 100° C. for 2 sec. The obtained three-layer specimen composed of the silicon wafer, silicone adhesive product, and the printed circuit board was heated for 2 hours with the application of heat in a 170° C. oven, whereby the silicone adhesive product was cured. The cured product was cooled to room temperature, and its shear adhesive resistance was measured by means of a die-shear tester at an extrusion speed of 50 mm/min.

A cured product was produced by subjecting the aforementioned silicone adhesive to heating for 2 hours at 170° C. after preheating for 2 sec. at 100° C. The obtained cured product was tested with regard to the storage modulus of elasticity at 30° C. The results are shown in Table 1.

Practical Example 2

A toluene solution was prepared by mixing 60 parts by mass of Component A2, 26.5 parts by mass of Component B2, 8 parts by mass of Component C1 (used in such an amount that the mole ratio of silicon-bonded hydrogen atoms contained in this Component C1 to the sum of vinyl groups of Components A2 and B2 is equal to 1.9), 1 part by weight of Component D1, and 0.5 parts by weight of Component F1, and dissolving the mixture in 100 parts by mass of toluene. The solution was then additionally mixed with 0.02 parts by mass of Component E1. Similar to the case of Practical Example 1, a 50 μm-thick film-like reactive hot-melt silicone adhesive product coated on both sides with PET films was obtained by using the aforementioned solution. By the same methods as in Practical Example 1, the obtained silicone adhesive composition was tested with regard to a storage modulus of elasticity at 30° C., melt viscosity at 100° C., gap-filling properties, and adhesive properties, while the cured product was tested with regard to storage modulus of elasticity at 30° C. The results of measurement are shown in Table 1.

Comparative Example 1

A film-like reactive hot-melt silicone adhesive product was obtained by the same method as in Practical Example 1, with the exception that component B1 was not used. Evaluation of the gap-filling properties by the same method as in Practical Example 1 showed that these properties were insufficient. Other characteristics of this comparative product have not been measured.

Comparative Example 2

A film-like reactive hot-melt silicone adhesive product was obtained by the same method as in Practical Example 1, with the exception that component D1 was not used. The obtained silicone adhesive composition was tested with regard to a storage modulus of elasticity at 30° C., melt viscosity at 100° C., gap-filling properties, and adhesive properties, while the cured product was tested with regard to storage modulus of elasticity at 30° C. The results of measurement are shown in Table 1. This product was satisfactory with regard to the gap-filling characteristics but had insufficient adhesive characteristics and a low shear adhesion strength that was equal to 0.2 MPa.

Comparative Example 3

A toluene solution was prepared by mixing 70 parts by mass of Component A3, 16.5 parts by mass of component B3, 13 parts by mass of Component C2 (used in such an amount that the mole ratio of silicon-bonded hydrogen atoms contained in this Component C2 to the sum of vinyl groups of Components A3 and B3 is equal to 1.8), 1 part by weight of Component D1, and 0.5 parts by weight of Component F1, and dissolving the mixture in 100 parts by mass of toluene. The solution was then additionally mixed with 0.02 parts by mass of Component E1. Similar to the case of Practical Example 1, a 50 μm-thick film-like reactive hot-melt silicone adhesive product coated on both sides with PET films was obtained by using the aforementioned solution. By the same methods as in Practical Example 1, the obtained silicone adhesive composition was tested with regard to a storage modulus of elasticity at 30° C., melt viscosity at 100° C., gap-filling properties, and adhesive properties, while the cured product was tested with regard to storage modulus of elasticity at 30° C. The results of measurement are shown in Table 1.

Practical Example 3

A toluene solution was prepared by mixing 60 parts by mass of Component A1, 26.5 parts by mass of Component B1, 13 parts by mass of Component C3 (used in such an amount that the mole ratio of silicon-bonded hydrogen atoms contained in this Component C3 to the sum of vinyl groups of Components A1 and B1 is equal to 1.1), and 0.5 parts by weight of Component F1, and dissolving the mixture in 100 parts by mass of toluene. The solution was then additionally mixed with 0.02 parts by mass of Component E1. Similar to the case of Practical Example 1, a 50 μm-thick film-like reactive hot-melt silicone adhesive product coated on both sides with PET films was obtained by using the aforementioned solution. By the same methods as in Practical Example 1, the obtained silicone adhesive composition was tested with regard to storage modulus of elasticity at 30° C., melt viscosity at 100° C., gap-filling properties, and adhesive properties, while the cured product was tested with regard to storage modulus of elasticity at 30° C. The results of measurement are shown in Table 1.

TABLE 1

| Properties | Practical Examples | | | Comparative Examples | |
|---|---|---|---|---|---|
| | 1 | 2 | 3 | 2 | 3 |
| Storage modulus of elasticity of the adhesive (Pa) | $3.0 \times 10^5$ | $3.5 \times 10^5$ | $2.0 \times 10^5$ | $3.0 \times 10^5$ | $2.6 \times 10^6$ |
| Melt viscosity (Pa · s) | $3.9 \times 10^2$ | $4.2 \times 10^2$ | $2.0 \times 10^2$ | $3.9 \times 10^2$ | $2.2 \times 10^4$ |
| Gap-filling properties | Exist | Exist | Exist | Exist | Absent |
| Shear adhesive strength (MPa) | 5.8 | 6.0 | 8.5 | 0.2 | 5.0 |
| Storage modulus of elasticity of the cured body (Pa) | $2.5 \times 10^8$ | $2.4 \times 10^8$ | $1.5 \times 10^8$ | $2.5 \times 10^8$ | $6.8 \times 10^7$ |

Practical Example 4

50 parts by mass of Component A1, 22.5 parts by mass of Component B1, and 15 parts by mass of dry-process silica having a BET specific area of 200 m²/g were mixed and kneaded for 1 hour at 170° C. in a kneader-mixer. The mixture was cooled to 100° C. and then further combined with 11 parts by mass of component C1 (used in such an amount that mole ratio of silicon-bonded hydrogen atoms contained in this Component C1 to the sum of vinyl groups of Components A1 and B1 is equal to 1.5), 1 part by mass of Component D2, 0.5 parts by weight of Component F1, and 0.2 parts by mass of component E2. A hot-melt silicone adhesive was prepared by mixing the aforementioned components for 30 min. at 100° C. The obtained adhesive was sandwiched between two fluorosilicone-treated PET films, and the laminate was subjected to hot compression in a mold (at 100° C.) for 1 min. Thereafter, the product was cooled to room temperature, whereby a 50 μm-thick film-like reactive hot-melt silicone adhesive product coated on both sides with PET films was obtained.

The obtained film-like silicone adhesive product had a storage modulus of elasticity at 30° C. equal to $2.7 \times 10^5$ Pa and melt viscosity at 100° C. equal to $3.0 \times 10^2$ Pa·s. The silicone adhesive product was also evaluated with regard to gap-filling capacity by the same method as in Practical Example 1, and the test showed good results. The cured product was tested with regard to storage modulus of elasticity at 30° C. and showed a value of $2.2 \times 10^8$ Pa. Adhesive properties of this product were evaluated by the method described below, and the results are shown in Table 2.

[Adhesive Properties]

The 50 μm-thick film-like reactive hot-melt silicone adhesive product coated on both sides with PET films was cut into pieces of 3 mm×3 mm. The PET film was peeled from one side of each piece, and a silicon wafer (thickness=700 μm) of 3 mm×3 mm was applied onto the exposed surface at room temperature and under pressure of 0.02 MPa. The second PET film was peeled off, and the exposed sides were applied to glass, aluminum, stainless steel, nickel, and polyimide substrates and attached to the aforementioned substrates by thermo-compressive bonding with application of a pressure of 0.02 MPa at 100° C. for 2 sec. The obtained three-layer specimens composed of the silicon wafer, silicone adhesive product, and the adherend were cured for 2 hours with the application of heat in a 170° C. oven, whereby the silicone adhesive products were cured. The cured products were cooled to room temperature, and their shear adhesive resistance was measured by means of a die-shear tester at an extrusion speed of 50 mm/min Comparative Example 4

A film-like reactive hot-melt silicone adhesive product was obtained by the same method as in Practical Example 4, with the exception that component D2 was not used. Evaluation of the gap-filling properties by the same method as in Practical Example 4 gave satisfactory results. By the same method as in Practical Example 4, the product was also tested with regard to adhesive properties. The results are shown in Table 2.

TABLE 2

| Properties | Example No. | |
| --- | --- | --- |
| | Practical Example 4 | Comparative Example 4 |
| | Shear adhesive strength (MPa) | |
| Glass | 12 | <0.1 |
| Aluminum | 14 | <0.1 |
| Stainless steel | 13 | <0.1 |
| Nickel | 12 | <0.1 |
| Polyimide resin | 10 | <0.1 |

INDUSTRIAL APPLICABILITY

Since the hot-melt silicone adhesive of the present invention is a reactive adhesive product that can be melted and cured and since it demonstrates good gap-filling ability during thermo-compressive bonding to adherends with high surface roughness even with the application of low pressures and provides strong adhesion to the adherend after cross-linking, this product is needed for the manufacture of semiconductor devices as a die-attachment material, molding material, etc. It can also be used in the electronic industry, construction industry, or the like.

The invention claimed is:

1. A hot-melt silicone adhesive comprising:
   (A) an organopolysiloxane resin with a softening point in the range of 40 to 250° C. that contains in one molecule at least one aryl group and contains neither a silicon-bonded alkoxy group nor a silicon-bonded hydrogen atom;
   (B) an organopolysiloxane that at 25° C. is liquid or is in the state of a crude rubber, which contains in one molecule at least two alkenyl groups and at least one aryl group and which contains neither a silicon-bonded alkoxy group nor a silicon-bonded hydrogen atom, wherein component (B) is added in an amount of 10 to 500 parts by mass per 100 parts by mass of component (A);
   (C) a composition selected from a mixture of (i) an organopolysiloxane that contains in one molecule at least two silicon-bonded hydrogen atoms and does not contain a silicon-bonded alkoxy group and (ii) an organic silicon compound that contains in one molecule at least one silicon-bonded alkoxy group; or (iii) an organopolysiloxane that contains in one molecule at least two silicon-bonded hydrogen atoms and at least one silicon-bonded alkoxy group;
   (D) a hydrosilylation catalyst; and
   (E) a hydrosilylation-reaction inhibitor.

2. The silicone adhesive of claim 1, wherein component (A) further contains in one molecule at least one alkenyl group.

3. The silicone adhesive of claim 1, wherein component (A) is an organopolysiloxane resin represented by the following average unit formula:

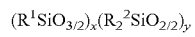
$(R^1SiO_{3/2})_x(R_2^2SiO_{2/2})_y$ wherein $R^1$ and $R^2$ may be the same or different optionally substituted univalent hydrocarbon groups; in one molecule, at least one of $R^1$ or $R^2$ is an aryl group; "x" and "y" are positive numbers that satisfy the following condition: x+y=1.

4. The silicone adhesive of claim 1, wherein the content of constituent (i) or constituent (iii) in component (C) is in the range of 0.1 to 50 parts by mass per 100 parts by mass of the sum of components (A) and (B).

5. The silicone adhesive of claim 1, wherein the content of constituent (ii) in component (C) is in the range of 0.01 to 20 parts by mass per 100 parts by mass of the sum of components (A) and (B).

6. The silicone adhesive of claim 1, wherein component (D) contains metallic platinum and wherein, in terms of mass units, the contents of metallic platinum of component (D) are in the range of 0.01 to 1,000 ppm per total mass of the sum of components (A) and (B).

7. The silicone adhesive of claim 1, wherein the content of component (E) is in the range of 0.00001 to 5 parts by mass per total mass of the sum of components (A) and (B).

8. The silicone adhesive according to claim 1, wherein said adhesive is made in the form of a film.

9. The silicone adhesive of claim 8, wherein peelable films are adhesively attached to said film.

10. The silicone adhesive according to claim 2, wherein said adhesive is made in the form of a film.

11. The silicone adhesive of claim 10, wherein peelable films are adhesively attached to said film.

12. The silicone adhesive according to claim 3, wherein said adhesive is made in the form of a film.

13. The silicone adhesive of claim 12, wherein peelable films are adhesively attached to said film.

14. A hot-melt silicone adhesive comprising:
   (A) an organopolysiloxane resin with a softening point in the range of 40 to 250° C. and represented by the following average unit formula:

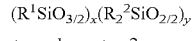
$(R^1SiO_{3/2})_x(R_2^2SiO_{2/2})_y$ wherein $R^1$ and $R^2$ may be the same or different optionally substituted univalent hydrocarbon groups; in one molecule, at least one of $R^1$ or $R^2$ is an aryl group; "x" and "y" are positive numbers that satisfy the following condition: x+y=1;
   (B) an organopolysiloxane that at 25° C. is liquid or is in the state of a crude rubber, which contains in one molecule at least two alkenyl groups and at least one aryl group and which contains neither a silicon-bonded alkoxy group nor a silicon-bonded hydrogen atom, wherein component (B) is added in an amount of 10 to 500 parts by mass per 100 parts by mass of component (A);

(C) a composition selected from a mixture of (i) an organopolysiloxane that contains in one molecule at least two silicon-bonded hydrogen atoms and does not contain a silicon-bonded alkoxy group and (ii) an organic silicon compound that contains in one molecule at least one silicon-bonded alkoxy group; or (iii) an organopolysiloxane that contains in one molecule at least two silicon-bonded hydrogen atoms and at least one silicon-bonded alkoxy group;

(D) a hydrosilylation catalyst; and (E) a hydrosilylation-reaction inhibitor.

* * * * *